(12) United States Patent
Chia

(10) Patent No.: US 11,078,654 B2
(45) Date of Patent: Aug. 3, 2021

(54) KITCHEN SINK AND THE METHOD OF INSTALLING THE SAME

(71) Applicant: Poh Yong Tony Chia, Singapore (SG)

(72) Inventor: Poh Yong Tony Chia, Singapore (SG)

( * ) Notice: Subject to any disclaimer, the term of this patent is extended or adjusted under 35 U.S.C. 154(b) by 0 days.

(21) Appl. No.: 16/100,357

(22) Filed: Aug. 10, 2018

(65) Prior Publication Data
US 2019/0048568 A1 Feb. 14, 2019

(30) Foreign Application Priority Data

Aug. 11, 2017 (SG) .............................. 10201706571P

(51) Int. Cl.
| | | |
|---|---|---|
| *E03C 1/33* | (2006.01) | |
| *E03C 1/18* | (2006.01) | |
| *F16B 2/06* | (2006.01) | |
| *F16B 35/06* | (2006.01) | |
| *F16B 2/12* | (2006.01) | |

(52) U.S. Cl.
CPC ................ *E03C 1/335* (2013.01); *E03C 1/18* (2013.01); *F16B 2/065* (2013.01); *F16B 2/12* (2013.01); *F16B 35/06* (2013.01)

(58) Field of Classification Search
CPC .............. E03C 1/33; E03C 1/335; E03C 1/18
See application file for complete search history.

(56) References Cited

U.S. PATENT DOCUMENTS

| | | | | |
|---|---|---|---|---|
| 2,514,740 A | * | 7/1950 | Brown ..................... | E03C 1/335 4/660 |
| 2,646,575 A | * | 7/1953 | Galley .................... | E03C 1/335 4/633 |
| 2,679,052 A | * | 5/1954 | Walsh ...................... | E03C 1/33 4/636 |
| 2,746,062 A | * | 5/1956 | Waltz ...................... | E03C 1/335 4/661 |
| 2,864,099 A | * | 12/1958 | Strahs ...................... | E03C 1/33 4/636 |
| 2,925,609 A | * | 2/1960 | Richardson ............. | E03C 1/335 4/633 |
| 3,020,563 A | * | 2/1962 | Just ........................ | E03C 1/335 4/633 |
| 3,034,144 A | * | 5/1962 | Lyon ...................... | E03C 1/335 4/634 |

(Continued)

FOREIGN PATENT DOCUMENTS

FR 2430532 * 2/1980 ............... E03C 1/33

*Primary Examiner* — J C Jacyna
(74) *Attorney, Agent, or Firm* — WPAT, PC

(57) ABSTRACT

A kitchen sink and the method of installing the kitchen sink is disclosed. The kitchen sink for flush mounting onto a counter top having a recess for the sink, comprising one or a plurality of sink basins thereon; a deck having a substantially horizontal top surface and edges having a recess formed into a rim around the perimeter of the kitchen sink, wherein the top surface of the deck is adapted to be substantially flush with the counter top upon the sink is being mounted to the counter top, and the edges of the rim is being formed into a flange; four corners of the sink being formed rounded such that when the sink is installed into the recess on the edge of the hole opening in the counter top, the flange is substantially flush with the counter top at a level surface thereof, whereby the kitchen sink is being mounted in flush fit of the deck and the counter top.

20 Claims, 18 Drawing Sheets

(56) References Cited

U.S. PATENT DOCUMENTS

| | | | | |
|---|---|---|---|---|
| 3,110,040 A * | 11/1963 | Richardson | E03C 1/33 | 4/633 |
| 3,711,173 A * | 1/1973 | Hoffman | E03C 1/335 | 312/140.4 |
| 3,813,707 A * | 6/1974 | Fowell | E03C 1/33 | 4/650 |
| 4,432,106 A * | 2/1984 | Smith | E03C 1/335 | 4/633 |
| 6,108,831 A * | 8/2000 | Lombreglia, Jr. | E03C 1/33 | 29/466 |
| 7,007,317 B1 * | 3/2006 | Brown | A47K 1/05 | 4/631 |
| 9,689,151 B2 * | 6/2017 | Miller | E03C 1/18 | |
| 2004/0078892 A1 * | 4/2004 | Albarran | E03C 1/33 | 4/633 |
| 2005/0039254 A1 * | 2/2005 | Brown | E03C 1/33 | 4/633 |
| 2006/0253974 A1 * | 11/2006 | Schneider | E03C 1/33 | 4/633 |
| 2015/0354188 A1 * | 12/2015 | Hocaoglu | E03C 1/18 | 4/633 |

* cited by examiner

KITCHEN SINK AND THE METHOD OF INSTALLING THE SAME

FIELD OF THE INVENTION

The present invention relates to a kitchen sink, and the method of installing the kitchen sink onto a countertop. The kitchen sink is flush mounted with the countertop.

BACKGROUND OF THE INVENTION

In Singapore as well as many countries, domestic kitchen sinks do not come pre-installed with the countertop in kitchens of residential houses. Usually the home owner is the decision maker in the selection of a kitchen sink to suit the use profile of the family using the kitchen sink. Likewise the work surface or counter top to which the kitchen sink is installed onto is selected based on a number of factors like colour scheme of the kitchen and user profile of family living therein. Kitchen-tops, the working surface on top of the kitchen cabinets, are made of wood, natural stone slabs, acrylic or polyester solid surfaces, or artificial quartz stone slab surfaces.

Modern kitchen sinks are generally made from aluminium, stainless steel or acrylic or polyester materials. Stainless steel sinks and aluminium are rust-resistant and fairly chemical resistant, while acrylic or polyester sinks are relatively stain resistant and easy to maintain.

In domestic kitchens, the counter top is generally custom designed to fit the confines of kitchen, while the kitchen sink is bought off the rack, and thus invariably the counter top and the kitchen sink are sold and marketed as separate units. Both kitchen sinks and counter tops are often made from different materials. For ease of use, kitchen sinks are usually positioned below the height of work surfaces, so that the mouth of the kitchen sink is at the height of the work surface. A variety of materials have been used for the manufacture of sinks and of work surfaces, with the preferred material combinations in different countries being usually a trade-off between performance and cost, with tradition and the availability of various raw materials affecting preferences.

One preferred material for the fabrication of counter tops is stone, that may be ground down and polished to a smooth and attractive finish, and that is scratch-resistant and resistant to chemical attack from household cleaners, lemon juice and other fluids with which it may come in contact. Instead of stone, acrylic, polyester and other artificial laminates such as formica, or chip-board countertops are also widely used. Although artificial materials provide a wider range of colours and textures than stone, they are generally less hard wearing, and their preference is usually for economic reasons.

The properties required for kitchen sinks are generally different from that required by the counter top the kitchen sink is fitted into. Kitchen sinks are manufactured from materials that are formable into deep containers, and are generally required to be waterproof to the extent, that when plugged, can hold water for long periods of time without warping, rusting or leaking. Stainless steel and aluminium has been the preferred choice of materials, with acrylic and polyester materials coming close by. Stainless steel or aluminium sinks are formed by folding and welding sheets together or using a mould to to stamp the sheets into shape.

Arising from such market requirements and partly as a result of historical developments and practices in manufacturing of household furnishings and equipment, counter tops have always been produced and marketed by granite and other building material suppliers on basis of colour, design and material of the work surface or counter top (hereinafter referred to as "countertop"). On the other hand, kitchen sinks are manufactured and marketed by household equipment manufacturers in a variety of shapes and sizes. Thus the home owner is the person responsible for selection of the right counter top to match the kitchen sink of the home owner's choice. However, the task of installation of the kitchen sink to fit the selected counter top is left to the installation team, which often is the countertop supplier.

In general a sink may be attached to a counter top in one of three ways:
  (i) Top mount above the countertop surface
  (ii) Under mount below the countertop surface
  (iii) Flush mount where the sink edges are flushed to the countertop surface

(i) Installation of Kitchen Sink on Top of the Counter Top (Called "Top Mount")

This installation method is used for mounting kitchen sinks on the stone countertops and similar countertop surfaces. Around the mouth of the kitchen sink basin, there is a rim which protrudes above the counter top as it latches on the edge of the hole opening of the countertop which receives the kitchen sink, and is usually secured and sealed with a water resistant adhesive/sealant/silicone.

FIG. 1 is a picture of a kitchen sink using top mount installation method.

(ii) Installation of Kitchen Sink Below the Counter Top (Called "Under Mount")

This is an established method for attaching kitchen sinks below the countertops. A hole is fabricated in the countertop surface, and the sink is attached below the hole. Generally, the edges of the hole in the countertop will be sanded down and polished to the same gloss level as the countertop surface. Under mount sinks allow liquids on the surface of the countertops to be wiped down into the sink basin.

FIG. 2 is a picture of a kitchen sink using under mount method method.

(iii) Installation of Kitchen Sink to Fit Flushed with the Surface of the Counter Top Currently in the market, flushed mount sinks are mainly confined only to acrylic and polyester kitchen sinks made to be glued to the surface of the acrylic and polyester countertops and then sanded down to flush forming a seamless structure from countertops into the sink basins, commonly known as "integrated sinks".

Problems Associated with the Current Kitchen Sinks Installation with the Counter Top Problems with Top Mount Sinks A disadvantage of this type of mounting is that liquids on the surface of the countertop cannot be wiped down into the sink basin due to the protruding edges of the kitchen sink. This leads to water retention especially at the back of the kitchen sinks area near the faucet or taps.

FIG. 3 is a picture of water retention on a countertop with a top mount kitchen sink.

Prolong exposure to water retained around the edges of the sink on top of the countertop will lead to dampness that traps dirt and promotes algae and fungi growth on the soft silicone sealant. This is both unsightly and unhygienic.

FIG. 4 is a picture of the edge of a kitchen sinks with the silicone sealant having algae growth.

Furthermore, many home owners will try to get rid of this unsightly dirt, algae or fungi by scrubbing it with abrasive clothe or pads, which invariably will cause tears to the silicone sealant. Many of them will then strip off the silicone sealants unknowingly as the tears are unsightly, thus letting water on the countertop surface seep through the gaps between the countertop and sinks into the kitchen cabinets below.

Problems with Under Mount Sinks

A disadvantage of this type of mounting is that the hole opening in the countertop forms an all round cantilever of 5-10 mm that overhangs over the sink basin, where dirt, algae, fungi, bacteria and germs are trapped. These hidden corners at the bottom of the overhanging parts of the countertop are not seen and seldom cleaned. Water droplets from the washing of raw food like fish, meat and vegetables tend to be splashed onto these hidden corners and retained there. Subsequent washing of raw food, may cause water to be splashed onto these hidden corners again and bring the dirt, algae, fungi, bacteria and germs flowing back to the raw food that you are supposed to wash clean and prepare for human consumption. A supposedly clean area for preparing food could well turn out to be the most unhygienic area for food preparation.

FIG. 5 is a picture showing an under mount kitchen sink with the hidden corners below the countertops.

Furthermore, an under mount sinks normally sits on a plywood that is placed on top of the kitchen cabinets. This plywood is flexible while the stone countertop is not. During daily usage of the kitchen sink, many pots and pans, plates and other utensils are placed inside the sink basin, which makes the kitchen sink very heavy. In the long run, the weight of the sinks will make the plywood sag, while the countertop remains stationery, thus tearing the silicone sealant that is used to seal the bottom of the countertop to the top of the kitchen sink. This leads to water seepage when water is splashed through the tears into the kitchen cabinets below.

FIG. 6 is an illustration of the setbacks of kitchen sinks using either the over mount or under mount methods of kitchen sink installation.

Problems with Solid Surface Flush Mount Sinks

A major disadvantage of solid surface flush mount sinks otherwise known as "integrated sinks" is that it scratches easily as it comes into constant contact with sharp utensils and metal pots and pans. Furthermore, the seams at the joints between the solid surface countertop and the sink can be visible with constant usage and even open up.

SUMMARY OF THE INVENTION

An object of the present invention is to provide a kitchen sink for flush mounting onto a counter top having a recess for the sink, comprising
 (a) one or a plurality of sink basins thereon;
 (b) a deck having a substantially horizontal top surface and edges formed into a rim around the perimeter of the kitchen sink, wherein the top surface of the deck is adapted to be substantially flush with the counter top upon the sink is being mounted to the counter top, and the edges of the rim is being formed into a flange;
 (c) four corners of the sink being formed rounded such that when the sink is installed into the recess on the edge of the hole opening in the counter top, the flange is substantially flush with the the counter top at a level surface thereof
 whereby the kitchen sink is being mounted in flush fit of the deck and the counter top.

A further object of the present invention is to provide a method of installing a kitchen sink onto a counter top having a recess, comprising the step of:
 (a) fabricating an opening on the countertop of dimension bigger than that of the outer edge of the kitchen sink but a smaller dimension than the rim edge of the kitchen sink; and
 (b) making a recess along the perimeter of the opening, wherein the recess is configured to receive the flange of the kitchen sink such that the height of the flange of the kitchen sink matches the depth of the recess, and such that when the kitchen sink is installed onto the countertop, the flange top surface is flush with the top surface of the countertop surface.

Yet another object of the present invention is to provide a kitchen sink, further comprising (d) a bracket mechanism having a U-channel stabilizing plate running all round the outer side of the sink basin, and a U-shaped bracket having a hole on bother ends thereof for a bolt to pass through for tightening with a butterfly bold, whereby the U-Channel stabilising plate is fixed onto the outer side of the basin of the kitchen sink, and the U-shaped bracket is then placed on to the U-channel stabilising plate.

Still yet another object of the present invention is to provide a kitchen sink, wherein the bracket mechanism is fitted onto the outer side of the basin of the kitchen sink.

A further yet another object is to provide a kitchen sink, wherein the U-shaped bracket is latched onto the U-channel stabilising plate, and a butterfly bold head is provided at one end of the bracket and a stopper foot is provided at the other end of the U-shaped bracket.

Yet a further object of the present invention is to provide a method of installing the kitchen sink, wherein the bracket mechanism is installed on the outer side of the basins of the kitchen sink so as to adjust the level of the flange to be ensure flushness to the counter top top surface at any position of the U-channel stabilising plate and also to secured the kitchen sink to the countertop.

Yet still a further object of the present invention is to provide a method of installing the kitchen sink, wherein the countertop for the kitchen sink is made from a material selected from natural stone and artificial quartz stone.

DETAILED DESCRIPTION OF THE PRESENT INVENTION

Figure 1:
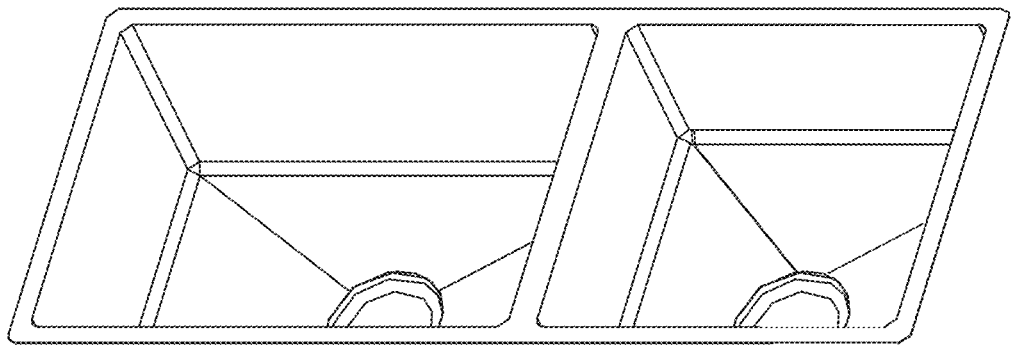
FIG. 1 is a picture of a kitchen sink using the top mount installation method.
Figure 2:
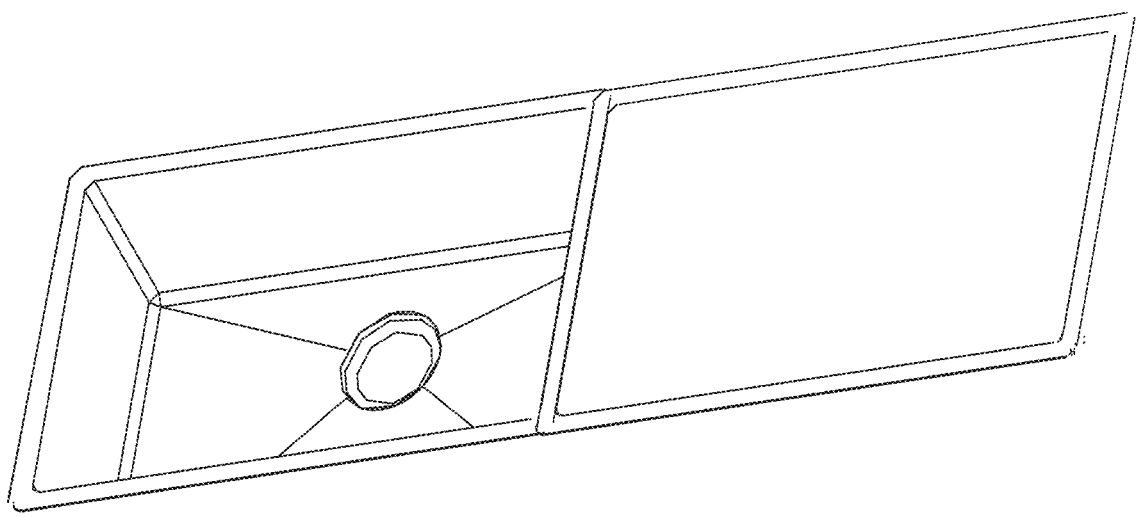
FIG. 2 is a picture of a kitchen sink using the under mount installation method.
Figure 3:
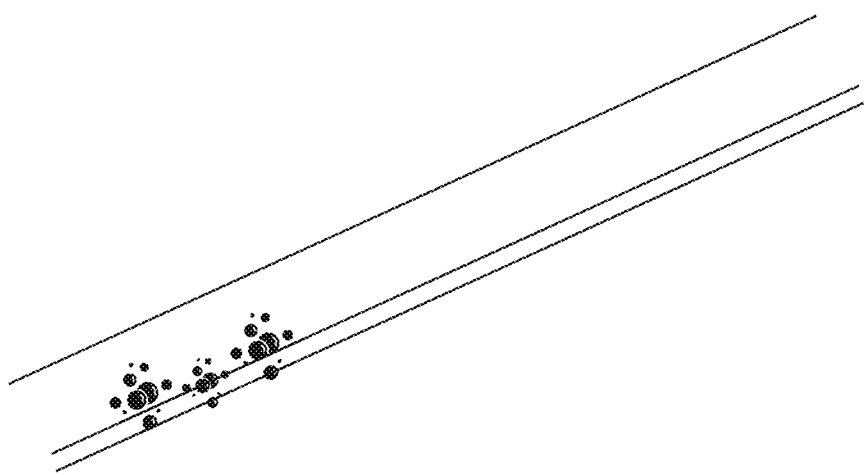
FIG. 3 is a picture showing water retention on a countertop with a top mount kitchen sink.
Figure 4:
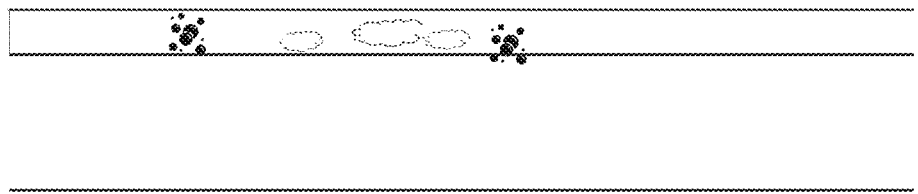
FIG. 4 is a picture of the edge of a kitchen sinks with the silicone sealant having algae growth.
Figure 5:
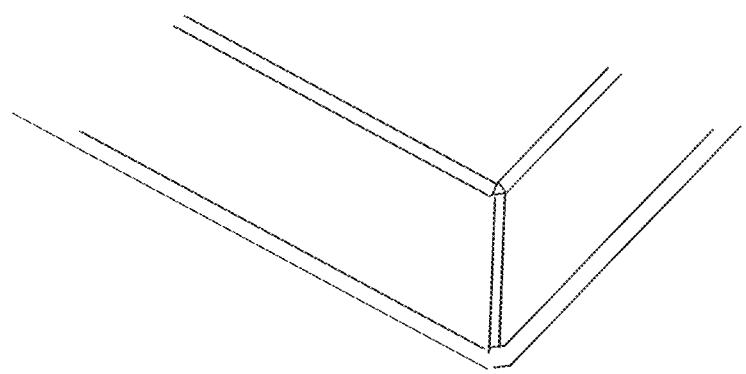
FIG. 5 is a picture showing an under mount kitchen sink with the hidden corners below the countertops.
Figure 6:
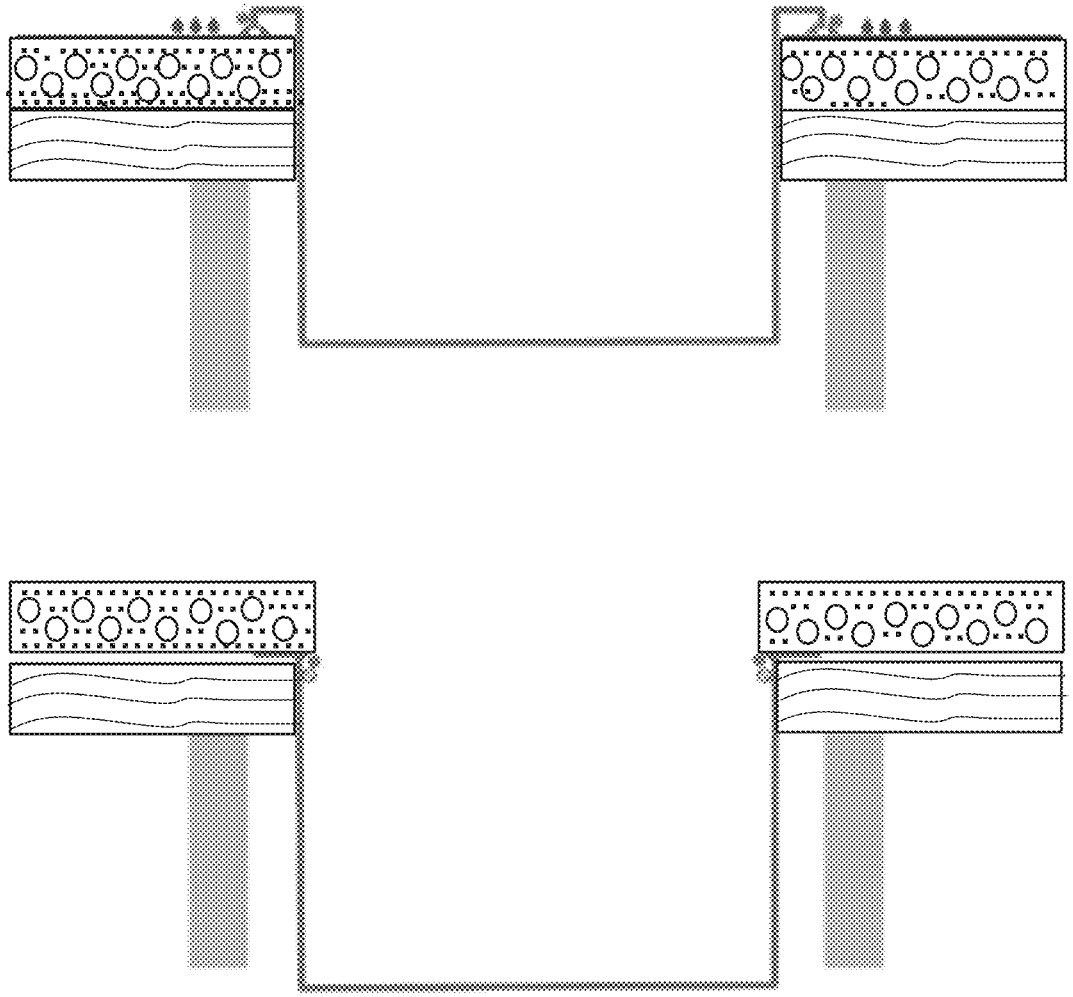
FIG. 6 is an illustration of the setbacks of kitchen sinks using either the top mount or under mount methods of kitchen sink installation.
Figure 7:
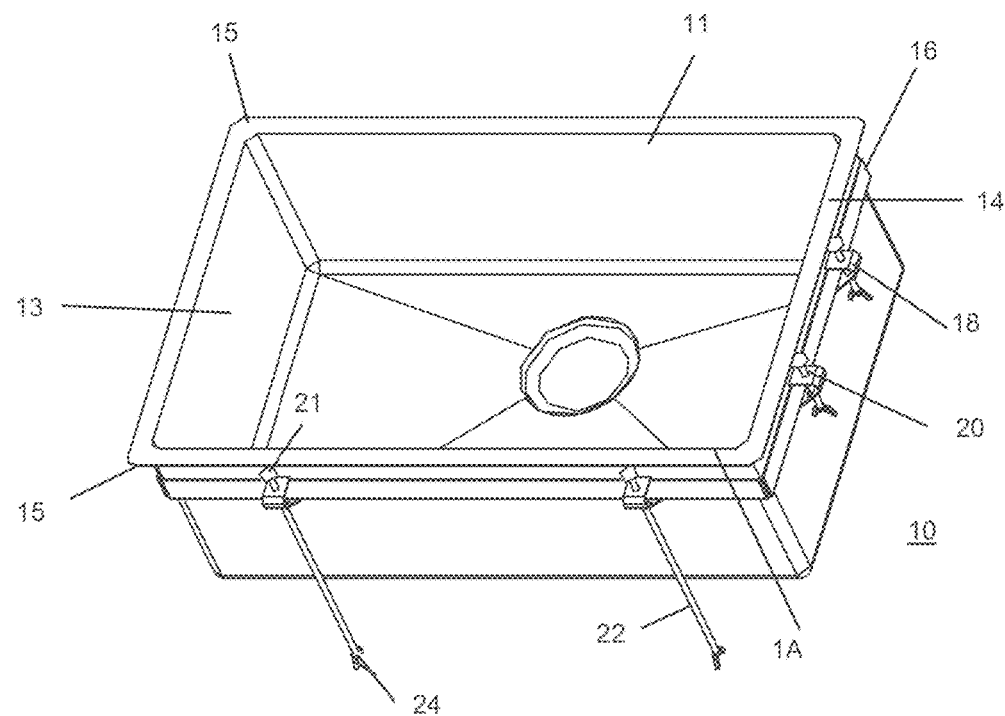
FIG. 7 is a perspective view of the handmade stainless steel kitchen sink of the present invention.
Figure 7:
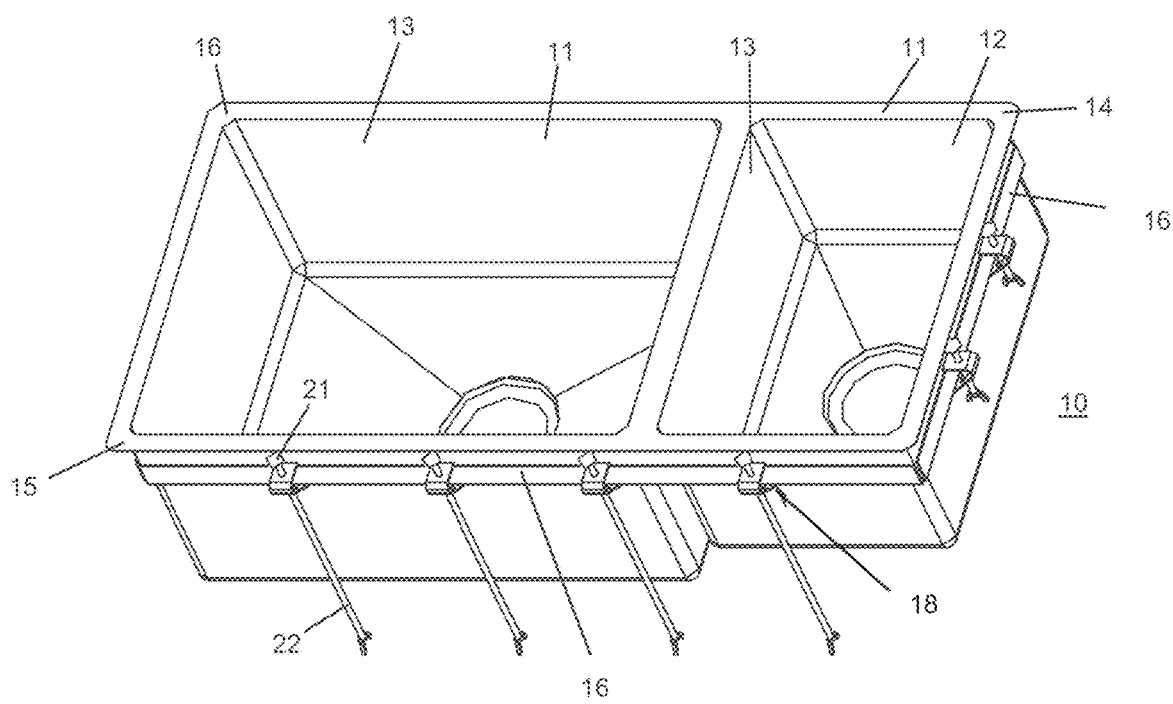
Figure 8:
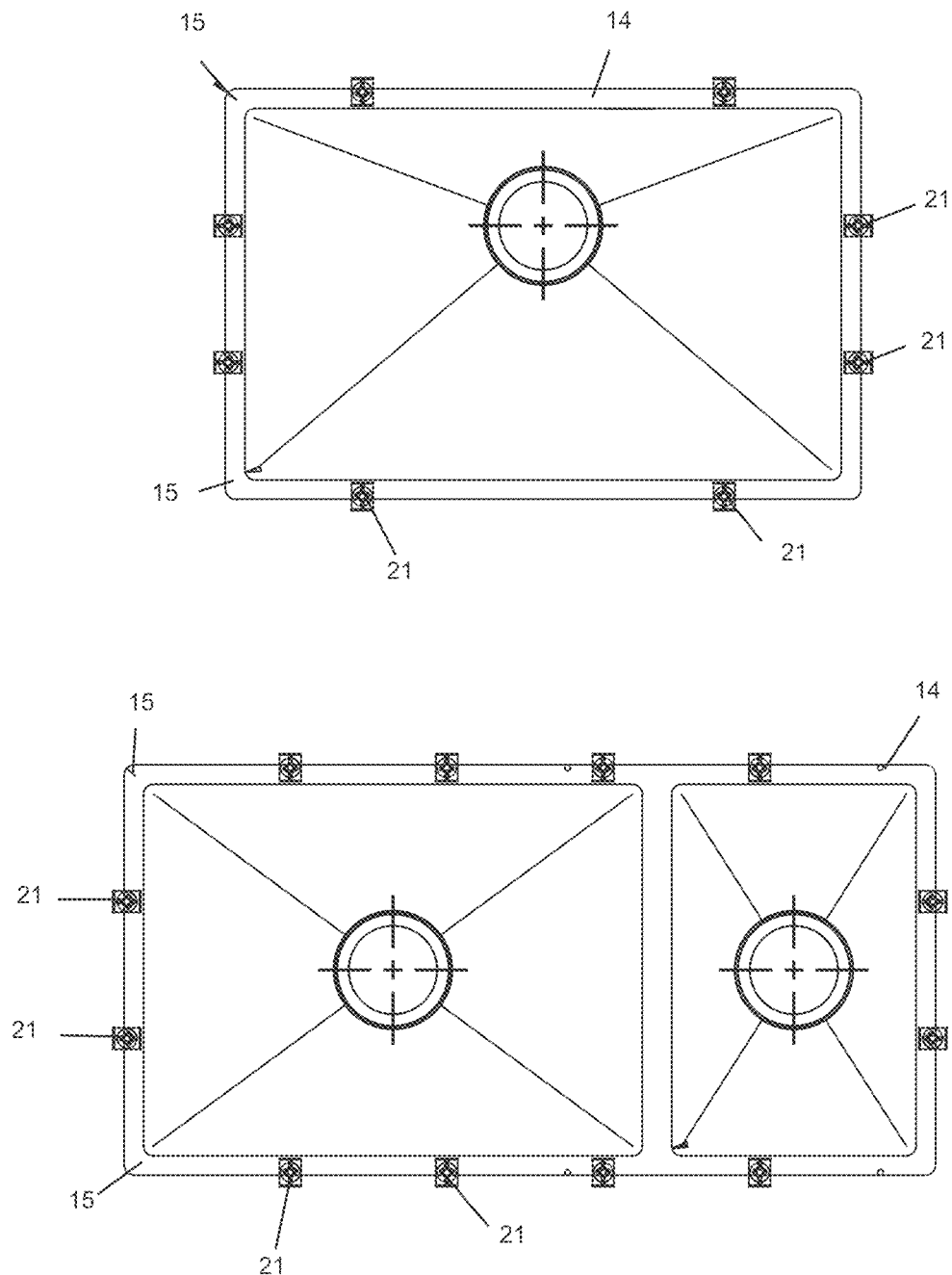
FIG. 8 is a plan view of the handmade stainless steel kitchen sink of the present invention.

Referring to FIG. 7, reference numeral 10, 10' generally designates the kitchen sink according to the present invention. FIG. 7 shows a perspective view of the handmade stainless steel kitchen sink 10, 10'. The kitchen sink 10, 10' has level plane edges 11 and corners 15 rounded to radius 11 mm. In the drawings, the kitchen basin is a single basin designated as numeral 10, and another is a double basin 10'. FIG. 8 is a plan view of the kitchen sink 10, 10' of the present invention. In the present preferred embodiment, the dimensions of the kitchen sink 10, 10' are as follows:

1. A handmade stainless steel kitchen sink having one (1) basin of internal dimension 610 mm×380 mm×200 mm and having outer edges or rims 11 of 650 mm×420 mm. The flange on the outer edges 11 is 20 mm wide all round.

2. A handmade stainless steel kitchen sink having two (2) basins, with one basin having an internal dimension of 510 mm×380 mm×228 mm and another basin having internal dimension of 250 mm×380 mm×178 mm, and having outer edges or rims of 830 mm×420 mm. The flange on the outer edges 11 is 20 mm wide all round.

3. Another handmade stainless steel kitchen sinks may be designed with one or two basins of varying sizes and with different outer edge dimensions, for example 803 mm×420 mm single basin, and 930 mm×420 mm double basin.

Figure 17:
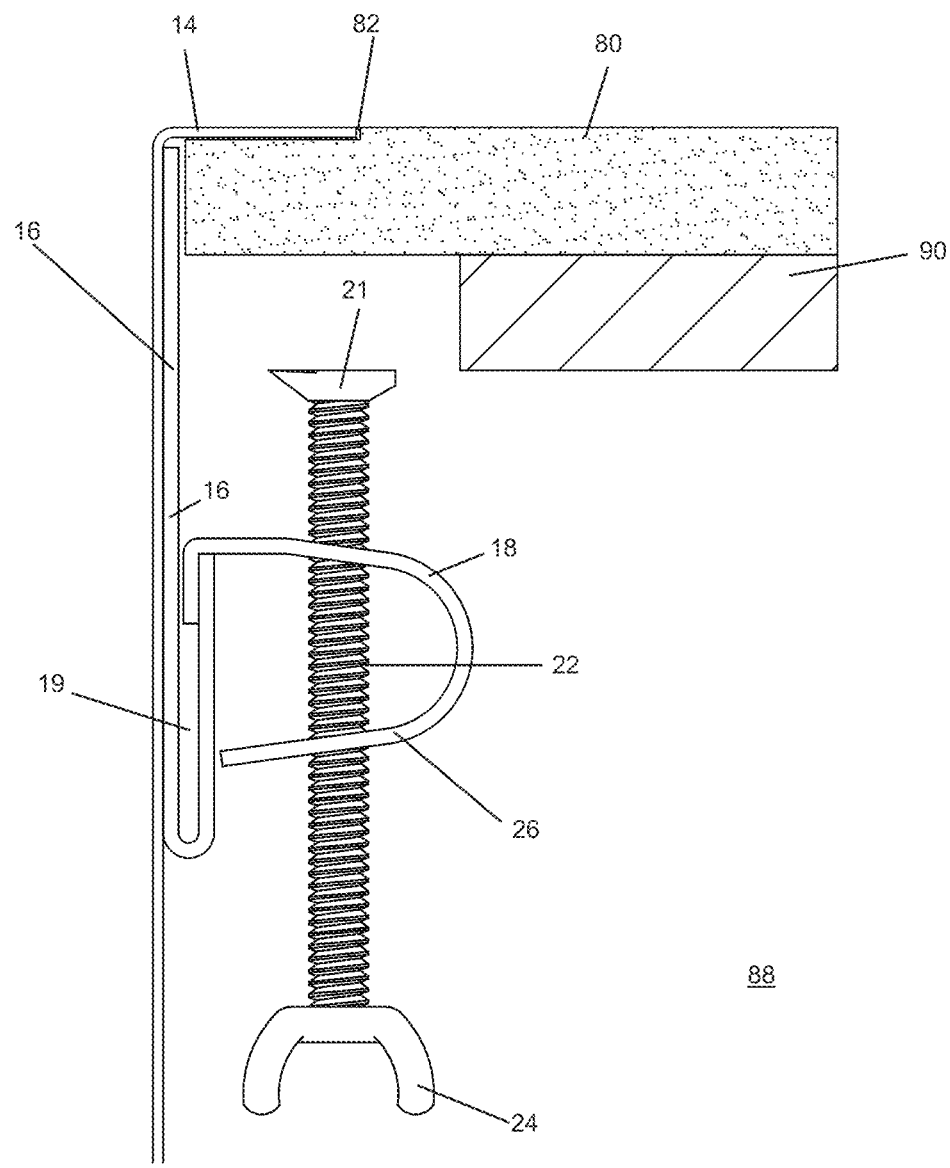
FIG. 17 is a side view of the bracket mechanism and installation onto receiving materials in accordance with the present invention.

In accordance with the present invention, the kitchen sink 10, 10' for flush mounting onto a counter top (as shown in FIG. 17) having a recess 82 for the sink mounting, comprising (a) one or a plurality of sink basins (11, 12) thereon;

(b) a deck having a substantially horizontal top surface and edges (14) formed into a rim around the perimeter of the kitchen sink (10, 10'), wherein the top surface of the deck is adapted to be substantially flush with the counter top upon the sink 10 is being mounted to the counter top, and the edges (14) of the rim is being formed into a flange;

(c) four corners (15) of the sink (10) being formed rounded such that when the sink (10) is installed into the recess on the edge of the hole opening (not shown) in the counter top, the flange is substantially flush with the counter top at a level surface thereof whereby the kitchen sink is being mounted in flush fit of the deck and the counter top. In the present preferred embodiment, the basin of the kitchen sink 10 is rectangular and may be made into a single basin, or a big and small bin in the kitchen sink 10'. The corners 15 of the sink are made rounded with a radius of, preferably 11 mm. Along the lateral side of the kitchen sink 10, 10' a rim, a bracket mechanism 16 with a plurality of U-channel brackets is provided to secure the sink to the kitchen top. The bracket mechanism is provided w a U-channel stabilizing plate 16 running all round the outer side of the sink basin, and a U-shaped bracket (18) having a hole on both ends thereof for a bolt 20 to pass through for tightening with a butterfly bold 22, whereby the U-Channel stabilising plate 16 is fixed onto the outer side of the basin of the kitchen sink 10, 10', and the U-shaped bracket 18 is then placed on to the U-channel stabilising plate 16.

In accordance to the preferred embodiment of the present invention, the internal dimension of the kitchen sink having a single basin is 610 mm by 380 mm by 203 mm, whereas the internal dimension of the kitchen sink having one two basins, that is a big basin and a small basin, is 510 mm by 380 mm by 228 mm for the big basin, and is 250 mm by 380 mm by 178 mm for the small basin.

As shown in FIG. 7, the U-shaped bracket 18 is latched onto the U-channel stabilising plate 16. A butterfly bolt head 21 is provided at one end of the bracket 18, and a stopper foot 24 is provided at the other end of the U-shaped bracket 18.

The kitchen sink of the present invention has to be manufactured according to these dimensions disclosed above for the good weight distribution and matching the tensile strength thereof.

The special feature of these inventive sinks is that the outer edge dimension of these sinks are die cut precisely to the desired dimension without any tolerance.

Figure 9:
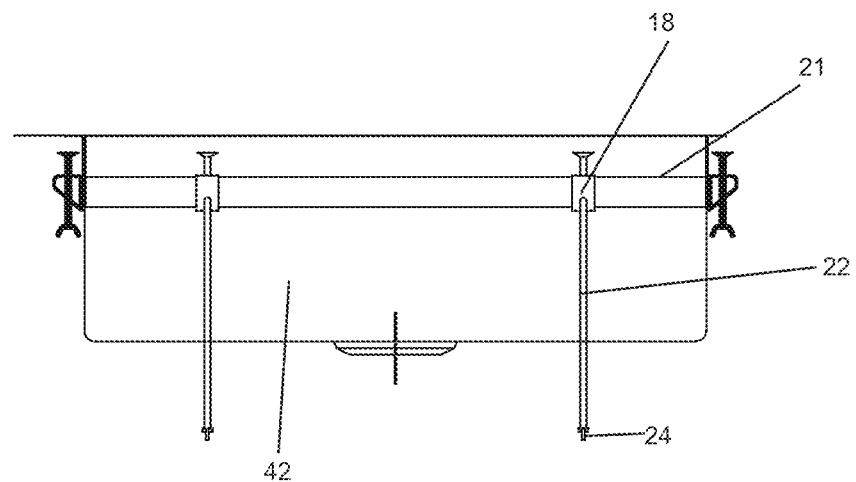
FIG. 9 is a front view of the handmade stainless steel kitchen sink of the present invention.
Figure 9:
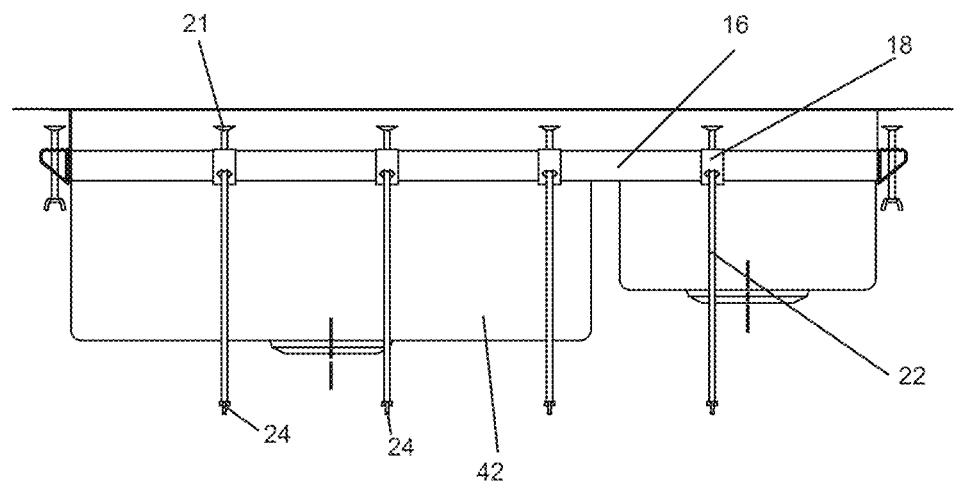

FIG. 9 shows elevation view of the kitchen sink in accordance with the present invention. In the Figures, there are shown the bracket mechanism with a strip of U-channel stabilising plate 16 that runs along the outer side of the sink basin 42 and U-shaped brackets 18 with a hole on both ends of the "U" for a butterfly bolt 22 to pass through which is then tightened with a butterfly bolt head 21 at one end and a stopper foot 24 at the other end. The strips of the U-channel stabilising plate 16 are welded or fastened to the outer side of the sink basin 42 just below the flanged of the sink edges 14. These strips runs along the outer side of the sink basin 42 so that the receiving U-shaped bracket 18 can hook onto any part of the U-channel stabilising plate 16, thus allowing the installers to adjust the height of any part of the sink basin edges 14 by tightening the butterfly bolt head 21 of the U-shaped brackets 18.

Figure 10:
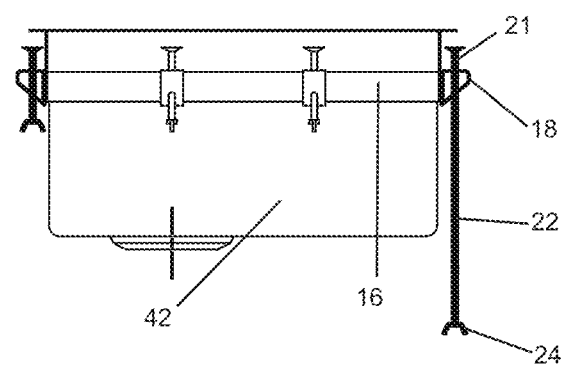
FIG. 10 is a side view of the handmade stainless steel kitchen sink of the present invention.
Figure 10:
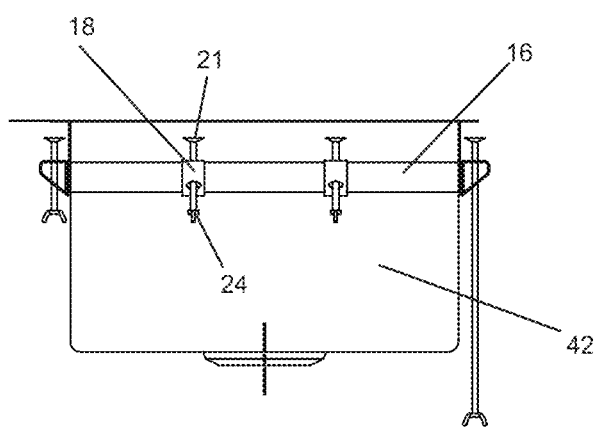

FIG. 10 is a side elevation view of the kitchen sink of the present invention. As shown in the figure, the strips of U-channel stabilising plate 16 run through the width of the sink basin 42.

Figure 11:
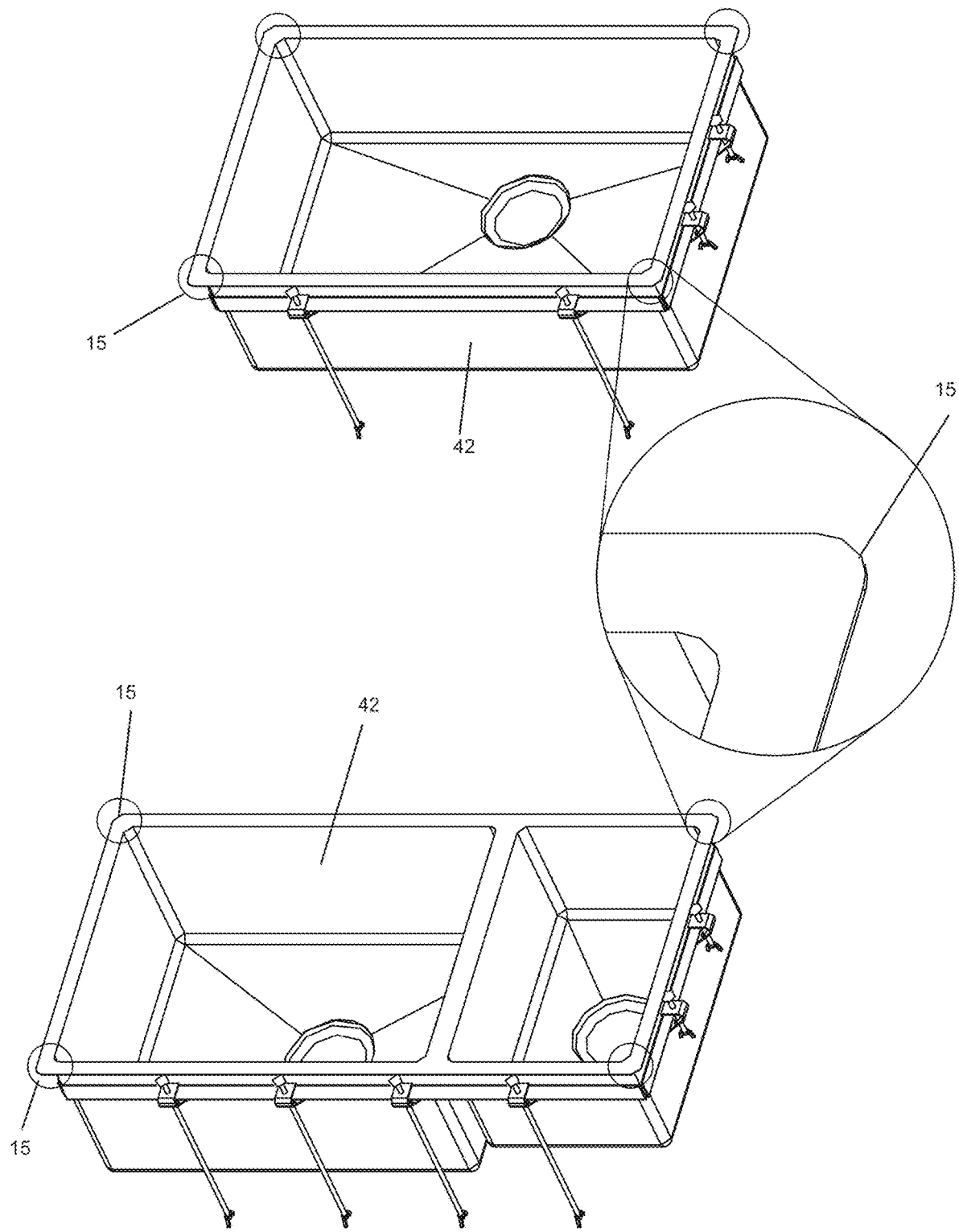
FIG. 11 is a perspective view of the present invention and a blown up view of the four corners of the handmade stainless steel kitchen sink rounded to radius 11 mm in accordance with the present invention.

FIG. 11 is a perspective view of the present invention, and an enlarged view of the four corners 15 of the kitchen sink basin 42 rounded to radius 11 mm in accordance with the present invention.

Figure 12:
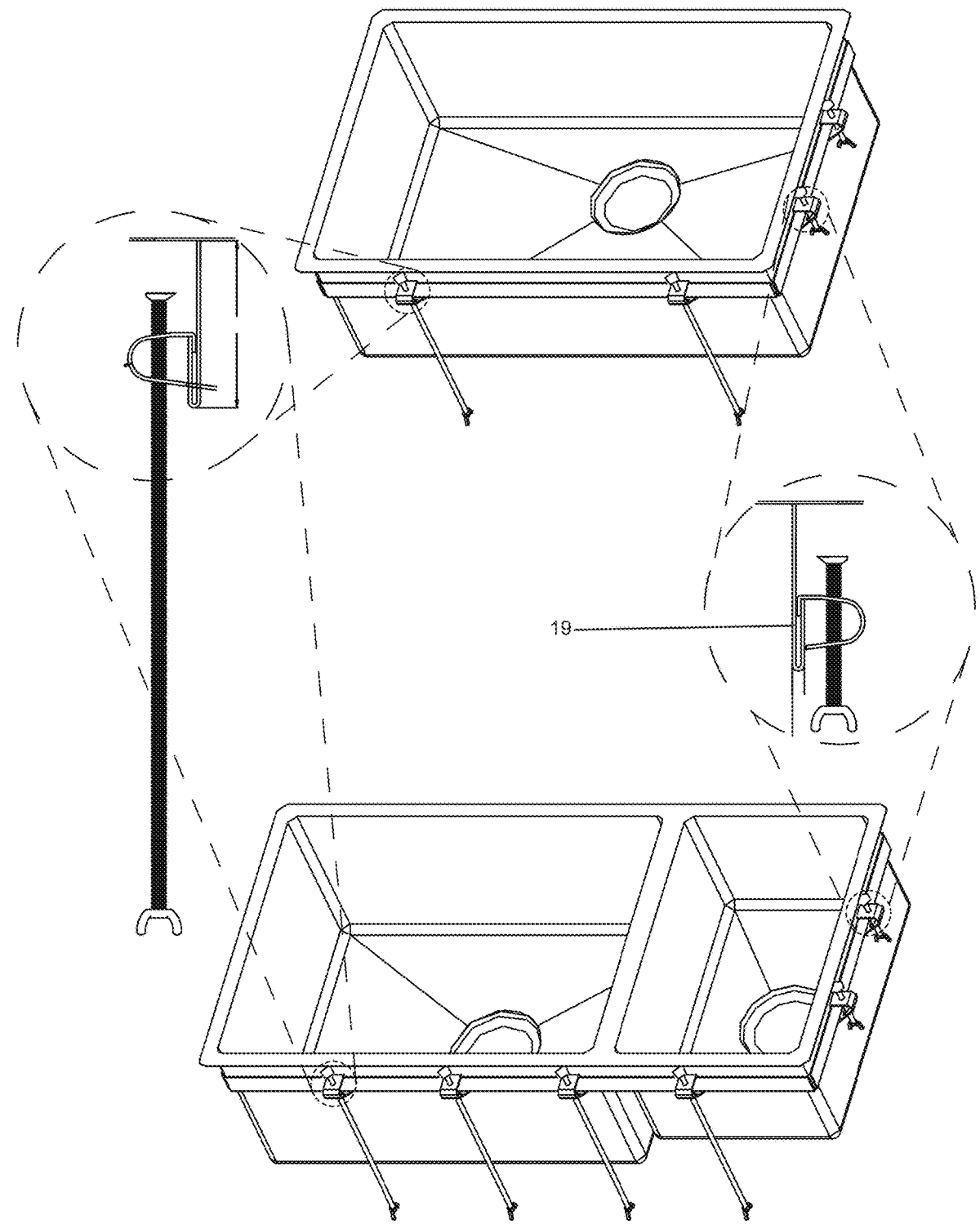
FIG. 12 is a blown up view of the bracket mechanism used to hold the kitchen sink onto the edge of hole opening in the stone counter top in accordance with the present invention.

FIG. 12 is a perspective view of the present invention and an enlarged view of the bracket mechanism 88 used to hold the kitchen sink basin 42 onto the edge of the counter top 80. In the drawing, the U-channel stabilising plate 16 runs all round the outer side of the sink basin 42. In the preferred embodiment, the strip is measured 70 mm in width and the U-channel 19 is 40 mm below the flanged of the edges 14 of the sink 10.

Figure 13:
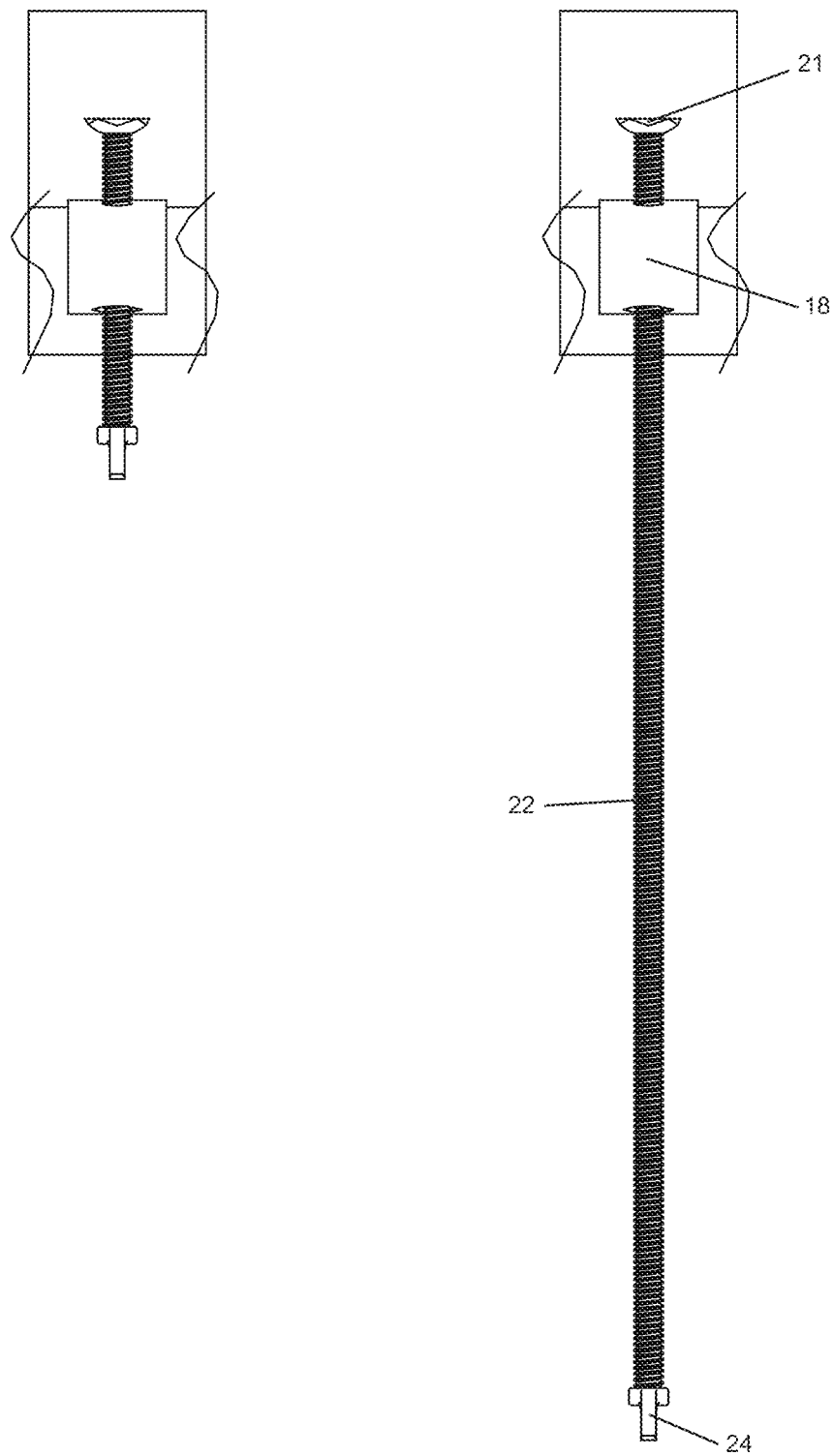
FIG. 13 is a front view of the bracket mechanism in accordance with the present invention.

FIG. 13 is a side elevation view of the bracket mechanism 88 which shows you how the strip of U-channel stabilising plate 16 runs through while the U-shaped bracket 18 can be adjusted to fit anywhere along it. In the preferred embodiment of the present invention, the dimension of the butterfly bolt 22 for the U-shaped bracket 18 comes in two lengths of 60 mm and 255 mm.

Figure 14:
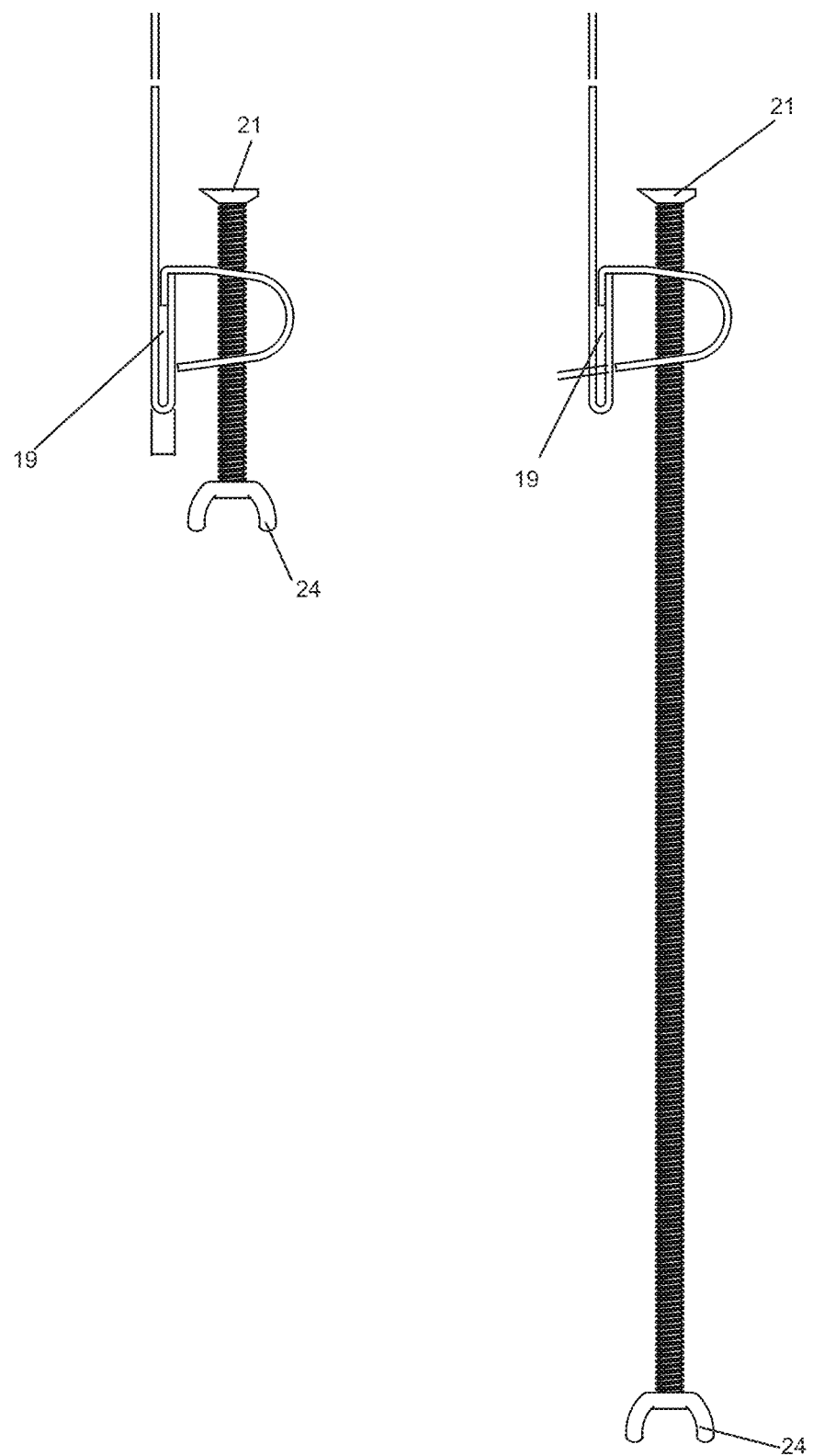
FIG. 14 is a side view of the bracket mechanism in accordance with the present invention.

FIG. 14 is a side elevation view of the bracket mechanism 88 in accordance with the present invention. The length of the bracket mechanism 88 preferably runs the whole length of the outer side of the sink basin 42, and the width of the bracket mechanism 88 is 70 mm and the depth of U-channel 19 is 30 mm.

Figure 15:
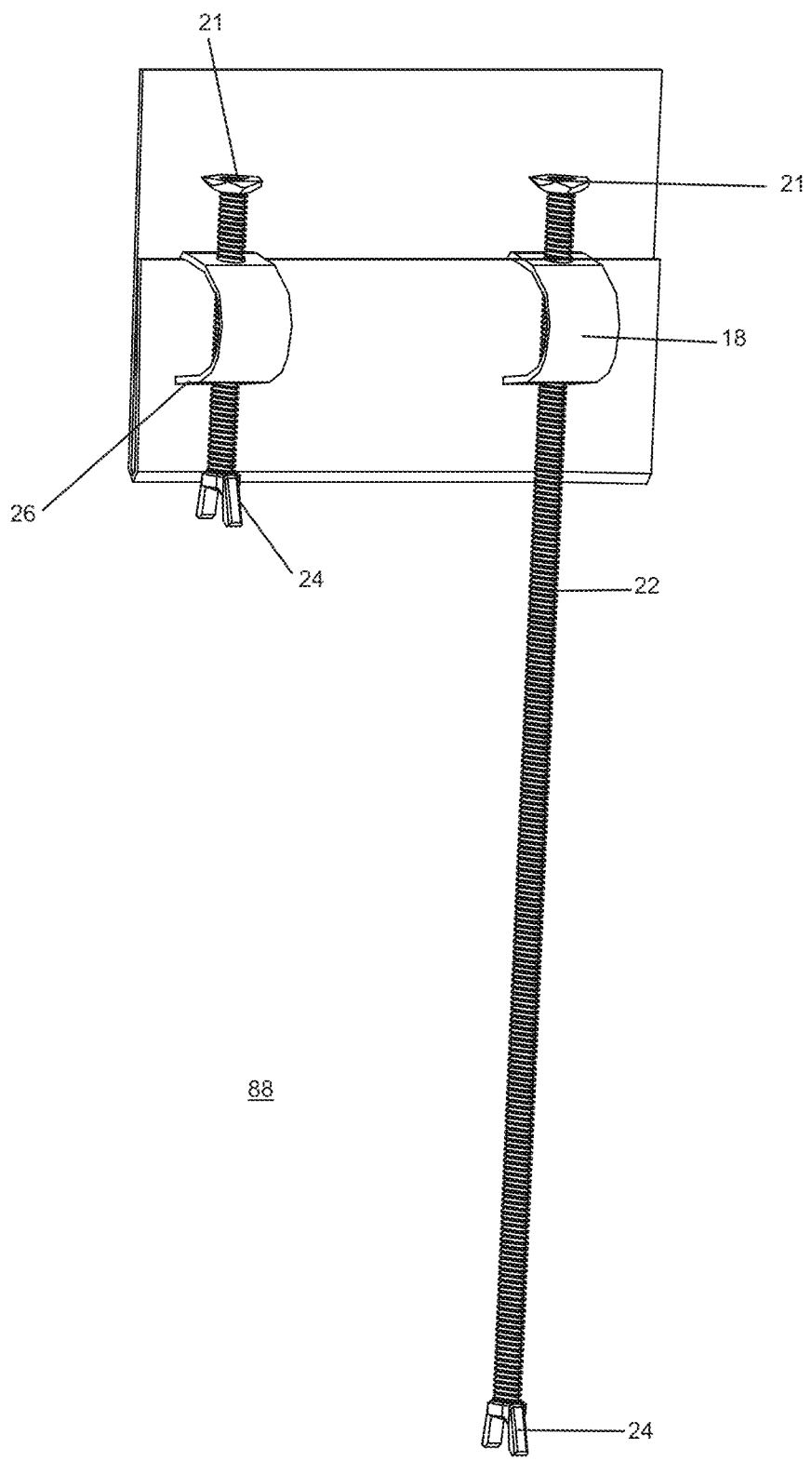
FIG. 15 is a perspective view of the bracket mechanism in accordance with the present invention.

FIG. 15 is a perspective view of the bracket mechanism 88 in accordance with the present invention. The bracket mechanism 88 comprises a strip of U-channel stabilising plate 16 and a U-shaped bracket 18 with one end of the U-shaped bracket having a hook 26 that is latched onto the U-channel stabilising plate 16. The U-shaped bracket 18 is provided with two holes through which a bolt 22 runs through and is used as a tightening device. The butterfly bolt 22 has a butterfly bolt head 21 to allow hand tightening, and a stopper foot 24 to secure the bracket 18 in place. The bolt 22 comes in two lengths of 60 mm and 255 mm, which when the bracket 18 is latched onto the U-channel stabilising plate 16, the butterfly bolt head 21 will drop below the sink basin depth, and be visible to the installer without needing him to go into the kitchen cabinet (not shown). Where to use the short or long bolt 21 of the U-channel bracket mechanism 88, it all depends on the whether the U-shaped bracket 18 is latched to the back of the sink U-channel 19 or the front of the sink U-channel 19, which is convenient for the installers to handle.

Figure 16:
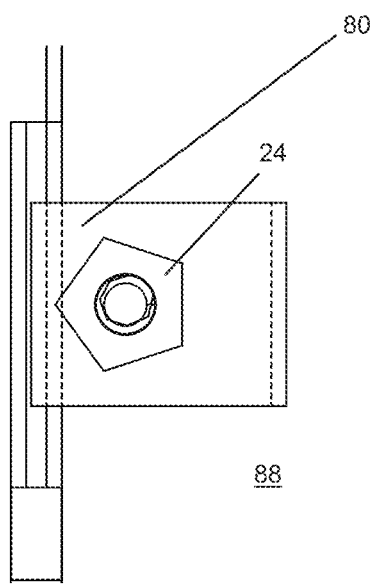
FIG. 16 is a top view of the bracket mechanism in accordance with the present invention.

FIG. 16 is a top view of the bracket mechanism 88 of the present invention. The stopper foot 24 at the other end of the bolt 22 presses against the bottom of the countertop 80 or wood substrate as a counter force to hold the bracket 18 in place in the U-channel 19.

FIG. 17 is a side elevation view of the bracket mechanism 88 of the present invention. In the drawing, the counter top 80 is of quartz material sitting on a substrate 90 which is made from wood. To fit the handmade stainless steel kitchen sink 10 to the quartz stone countertop 80, a hole opening 100 (not shown) on the countertop 80 is made big enough for the kitchen sink basin to go through but the hole opening 100 must be small enough for the edge 14 of the kitchen sink 10 to latch onto to prevent the kitchen sink 10 from falling through. A recess 82 is made around the edge of the hole opening 100 in the quartz stone countertop 80 so that the flanged edge 14 of the kitchen sink 10 can sit in the recess 82 on the edge of the hole opening 100. As the stainless steel is 1.2 mm thick, and the flanged edge 14 of the kitchen sink 10 is 20 mm wide, the depth of the recess 82 must be 1.2 mm or more and the width must be 20 mm or less.

To cut the 1.2 mm or more deep and 20 mm or less wide recess 82 along the edge of the hole opening 100 on the quartz stone counter top 80, the stone counter top 80 must program the use of a CNC stone router machine and fabricate the recess 82 on the stone countertop 80 to the required depth and width and dimensions. The smallest CNC stone router bit has a diameter of 20 mm which will create the 4 corners of the recess 82 to be able to receive the kitchen sink 10 with the rounded corners 15 of radius 11 mm.

After fitting the kitchen sink 10 or 10' to the recess 82 of the countertop 80, the bracket mechanism 88 is used to adjust and secure the level of the kitchen sink 10 to be flushed with the countertop 80 surface. The number of bracket mechanism 88 used to adjust and secure the kitchen sink 10 to the countertop 80 varies in accordance with the requirements of the installer who needs to determine which part of the edges 14 of the sink 10 need to be adjusted and tightened to pull the sink 10 down to fit snugly and flushed to the surface of the countertop 80.

As shown in FIG. 17, the bracket mechanism 88 works with the stopper foot 24 at the tip of the bolt 22 extending upwards towards the countertop 80 or wood substrate base 90, and presses against the base of the countertop 80 as the butterfly bolt head 21 is tightened. A pressure is exerted at the base of the countertop 80, the U bracket 18 will be pushed downwards relative to the bolt 22 and the hook 26 of the U-bracket 18 will be pressed towards the U-channel stabilising plate 16, thus immobilising the U-bracket 18 to the U-channel stabilising plate 16.

Figure 18:
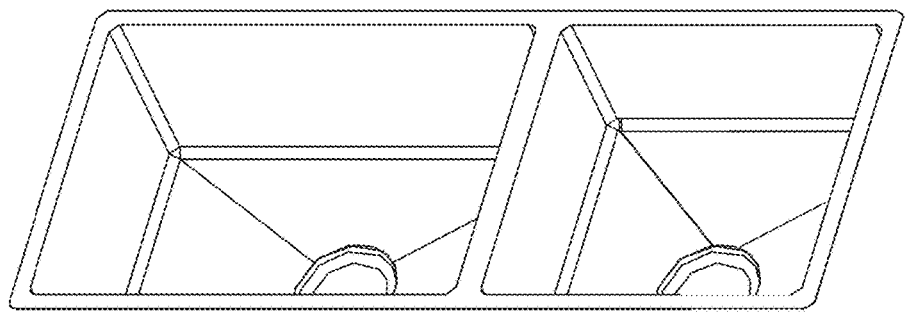
FIG. 18. is a picture of the flush mount sink on a quartz countertop in accordance with the present invention.

FIG. 18 shows a completed work of a flush mount sink 10 on a quartz countertop in accordance with the present invention.

Advantageous Effects of the Invention

This new type of handmade stainless steel kitchen sink, where you can fit its flange at the rim edges snugly into a recess created at the edge of the hole opening in the stone countertop, and secure it with the specially designed bracket mechanism, so that you can adjust the top kitchen sink level to flush it to the top surface of the stone countertop, offers these advantages:

A. Improved Sense of Aesthetics

This new type of kitchen sinks looks like it is "integrated" with the stone countertop as it seems to join seamlessly to the countertop surface. There are no protruding sink edges like those normal top mount kitchen sinks, and there are no hidden corners that you can see under the hole opening in the countertop, which makes the sink looks like it is separate object from the countertop. Flush mount sinks makes the kitchen countertop surface flows into the kitchen sink basin making it look very pleasing to the eye.

B. Improved Hygiene Standards

As this new type of kitchen sink looks like it is "integrated" with the stone countertop, there are no concave corners to trap dirt. The top mount sinks have the protruding top sink edges and the under mount sinks have the space between the countertop hole opening and the sink basin mouth, which traps a tremendous amount of dirt and food waste, which over time can only become more and more unhygienic. A place where food preparation is routinely done, we would expect it to be the cleanest place in the house, but it can turn out to be the most unhygienic using top mount or under mount sinks. With the flush mount sinks, you will not have any corners which can trap dirt or food waste, and you can see every part of the sink area.

C. Reduce Measurement Time

The new type of kitchen sink comes in specific dimension with precise rim dimension achieved by die cutting. This reduce the measurement time for the sink on site as the specific dimensions is predetermined.

D. Reduce Fabrication Time and Effort

As the new type of kitchen sink comes in specific dimension with precise rim dimension, we only need to use the programmed CNC stone router to automatically cut the hole opening and also to cut the recess at the edge of the hole opening to receive the kitchen sink flange. This saves a lot of time and effort as we don't need to manually cut the hole opening, and use a variety of time consuming and labour intensive method to fabricate the recess. Furthermore, we also do not need to polish the hole opening edges for the under mount kitchen sinks, which also takes up a lot of time and effort.

E. Prevent Water Retention

As the new type of kitchen sinks is flushed with the surface of the countertop, liquids can be easily wiped into the sink basin. Whatever moisture remaining on the countertop will be easily evaporate. Whereas the top mount kitchen sinks' protruding rim edges will form a curb to prevent you from wiping liquids into the sink basin, especially for the areas behind the faucet where liquid is constantly trapped between the sink edges and the back panel or skirting. Using a clothe can only wipe the bulk of the liquid into the sink basin, but the little residue liquid left is very hard to get rid of completely. This makes the countertop areas around the top mount sinks constantly wet or damp.

F. Prevent Algae Growth

As this new type of kitchen sinks has no concave corners that are hidden, and the areas around the sink edges are wiped clean and dry, and there are no moist or damp area, there will be no chance for algae to grow. Compared to the top mount sinks, where the areas around the protruding sink edges easily traps dirt and food waste and also is constantly wet or damp, algae grows there easily. As for the under mount sinks, the space between the bottom edge of the countertop hole opening and the mouth of the sink basin, these areas are wet and dirty constantly and that promotes algae growth.

G. Prevent Water Seepages

This new type of kitchen sink sits on top of the countertop, and fits snugly in the recess of the hole opening in the countertop, and silicone sealant is applied on the recess so that the entire bottom flap of the flange of the kitchen sink is glued to the surface area of the recess, forming a water tight structure.

As for top mount sinks, silicone sealant is put around the outside of the protruding sink edges to prevent water from seeping through the gap. However, we know that the silicone sealant gets dirty and have algae growth often due to constant contact with dirt and water, and the preferred way of cleaning this is using an abrasive scrub. However, if you scrub too hard with abrasive pads, or use metallic abrasive scrub, or long term use of abrasive scrub on the silicone sealant, it will lead to tears on the silicone sealant, and if you are uninformed or not careful, you will remove some parts of the silicone sealant and this will lead to water seepage into the cabinets below the kitchen sink.

While the under mount sinks seems like a good idea, the fact is that the sink sits on a wood substrate placed on top of the receiving cabinets, then the stone countertops will be placed over the sink. During daily usage and washing of pots and pans and dishes, the sink will get very heavy. The weight of the sink will sag the wooden substrate in the long run and this will tear the silicone sealant placed between the hard stone countertop and the sink basin mouth. Water splashing in the sink can then easily seep through the gaps of the torn silicone sealant and into the cabinets below. Long term exposure of water on the cabinets below will damage the wooden structure.

H. Eliminate Unhygienic Hidden Corners

The new type of kitchen sinks do not have any hidden corners as every part of the sink can be seen. As for the under mount sinks, the edge of the hole opening on the countertop normally cantilever and over-hang over the mouth of the kitchen sink basin. The areas below the edge of the hole opening is normally not visibly. This hidden corner is very unhygienic because the sink is used for washing of raw food like seafood, meat products and vegetables, and water droplets from these raw food tend to be splashed all over the place and of course some will be stuck in this hidden corners. All types of bacteria and germs are trapped there and generally people do not clean these corners. If you are preparing raw food, and water is splashed onto these hidden corners and carry these bacteria and germs onto your raw food, it will be very unhygienic for you and your family especially young children and elderly people. Food preparation place should be visible and easily cleaned, and not have any unhygienic hidden corners.

Other Embodiments

While an embodiment with specific dimensions of the handmade stainless steel kitchen sink and bracket mechanism are discussed, it should be apparent, however, that various modifications, rearrangements, substitutions, alterations and adaptations to those embodiments may occur to persons skilled in the art with the attainment of some or all of the advantages of the present invention. Accordingly, it should be clearly understood that the present invention is not intended to be limited by the particular dimensions, features and structures hereinbefore described and depicted in the accompanying drawings. It is therefore intended to cover all such modifications, alterations and adaptations without departing from the scope and spirit of the present invention as defined by the appended claims.

What is claimed is:

1. A kitchen sink for flush mounting onto a countertop having a hole opening and a recess along the edge of the opening for the kitchen sink, comprising:
   (a) one or a plurality of sink basins thereon;
   (b) a deck having a substantially horizontal top surface and edges formed into a rim around the perimeter of the kitchen sink, wherein the top surface of the deck is adapted to be substantially flush with the counter top upon the sink is being mounted to the counter top, and the edges of the rim is being formed into a flange;
   (c) four corners of the sink being formed rounded such that when the sink is installed into the recess on the edge of the hole opening in the counter top, the flange is substantially flush with the counter top at a level surface thereof, whereby the kitchen sink is being mounted in flush fit of the deck with the counter top; and (d) a bracket mechanism having a U-channel stabilizing plate fitted onto an outer side of the sink basin, and a U-shaped bracket placed onto the U-channel stabilizing plate, wherein a top end of the U-shaped bracket has a hook for engaging an interior of the U-channel stabilizing plate, and a U-shape of the U-shaped bracket having a first top end at the hook and a second bottom end lowered than the hook.

2. The kitchen sink as set forth in claim 1, wherein two or more of the U-channel stabilizing plates are fitted onto the outer side of the sink basin and the U-shaped bracket has opposing holes for accommodating a bolt to pass through and tightening with a butterfly bolt head.

3. The kitchen sink as set forth in claim 1 wherein the bracket mechanism is fitted onto the outer side of the basin of the kitchen sink.

4. The kitchen sink as set forth in claim 2, wherein the U-channel stabilizing plate is provided with a U-channel formed at a lower end of the stabilizing plate.

5. The kitchen sink as set forth in claim 1, wherein the internal dimension of the sink basin having a single basin is 610 mm by 380 mm by 203 mm.

6. The kitchen sink as set forth in claim 1, wherein the internal dimension of the sink basin having dual basins, a big basin and a small basin, is 510 mm by 380 mm by 228 mm for the big basin, and is 250 mm by 380 mm by 178 mm for the small basin.

7. The kitchen sink as set forth in claim 2, wherein the U-shaped bracket is latched onto the U-channel stabilizing plate.

8. The kitchen sink as set forth in claim 3, wherein a butterfly bolt head is provided at one end of the bracket and a stopper foot is provided at the other end of the U-shaped bracket.

9. The kitchen sink as set forth in claim 8, wherein the butterfly bold head is turned until the stopper foot passes against the underside of the countertop.

10. The kitchen sink as set forth in claim 7, wherein the U-shaped bracket is tightened to the external lateral side of the sink.

11. The kitchen sink as set forth in claim 8, wherein the butterfly bolt is either 60 mm in length or 255 mm in length, which allows manual tightening of the sink.

12. A method of installing a kitchen sink onto a counter top, comprising the steps of:
(a) fabricating a hole opening on the countertop of dimension bigger than that of an outer edge of the kitchen sink but a smaller dimension than a rim edge of the kitchen sink;

(b) making a recess along the perimeter of the opening, wherein the recess is configured to receive the edge of the kitchen sink such that a flange height of the kitchen sink matches a depth of the recess, and such that when the kitchen sink is installed onto the countertop, a flange top surface is flush with the countertop surface; and (c) utilizing a bracket mechanism having a U-channel stabilizing plate fitted onto an outer side of a sink basin, and a U shaped bracket placed onto the U-channel stabilizing plate, wherein a top end of the U-shaped bracket has a hook for engaging an interior of the U-channel stabilizing plate, and a U-shape of the U-shaped bracket having a first top end at the hook and a second bottom end lower than the hook.

13. The method of installing a kitchen sink as set forth in claim 12, wherein the corners of the opening on the counter top has a radius of 11 mm to receive the corners of the kitchen sink, which has corners rounded to radius of 11 mm.

14. The method of installing a kitchen sink as set forth in claim 12, wherein the bracket mechanism is installed on the outer side of the basins of the kitchen sink so as to adjust the level of the flange to ensure flushness to the counter top surface at any position of the U-channel stabilizing plate and also to secure the kitchen sink to the countertop.

15. The method of installing a kitchen sink as set forth in claim 12, wherein the recess round the opening is preferably 20 mm wide.

16. The method of installing a kitchen sink as set forth in claim 12, wherein the height or depth of the recess matches the height or depth of the flange of the kitchen sink so that the top surface of the kitchen sink is level plane with the top surface of the counter top.

17. The kitchen sink as set forth in claim 1, wherein the kitchen sink is made from a material selected from the group consisting of stainless steel, copper, brass and bronze.

18. The method of installing a kitchen sink as set forth in claim 12, wherein the kitchen sink is made from a material selected from the group consisting of stainless steel, copper, brass and bronze.

19. The kitchen sink as set forth in claim 1, wherein the countertop for the kitchen sink is made from a material selected from natural stone and artificial quartz stone.

20. The method of installing a kitchen sink as set forth in claim 12, wherein the countertop for the kitchen sink is made from a material selected from natural stone and artificial quartz stone.

* * * * *